United States Patent

[11] 3,585,358

| [72] | Inventor | Ole K. Nilssen<br>Barrington Hills, Ill. |
|---|---|---|
| [21] | Appl. No. | 844,493 |
| [22] | Filed | July 24, 1969 |
| [45] | Patented | June 15, 1971 |
| [73] | Assignee | Motorola, Inc.<br>Franklin Park, Ill. |

[54] AUTOMOTIVE QUICK HEAT SYSTEM
9 Claims, 3 Drawing Figs.

[52] U.S. Cl.................................................... 219/279,
219/202, 307/10 R, 320/64, 322/5
[51] Int. Cl.............................................................. F24d 11/100
[50] Field of Search......................................... 219/202,
279; 322/5, 6; 320/64; 307/10

[56] References Cited
UNITED STATES PATENTS
3,440,398  4/1969  Nilssen................... 219/279
3,469,072  9/1969  Carlson.................. 219/202
3,469,073  9/1969  Zechin................... 307/10 X Primary Examiner—J. V. Truhe
Assistant Examiner—C. L. Albritton
Attorney—Mueller and Aichele ABSTRACT: An auxiliary heating system for an automotive vehicle which utilizes two rotating field alternators for providing power to either a center tapped, resistive, quick heat load or to the DC load and battery of the automotive vehicle. The terminals of the quick heat load are connected to the alternators, and a center tap thereof is connected through the DC load to ground. A switching mechanism is operable to deliver field voltages of the same or opposite polarities to the alternators. When the field voltages are the same polarity, the output voltages of the alternators are in phase and deliver power to the DC load. When the field voltages are opposite in polarity the output voltages of the alternators are 180° out-of-phase and deliver power to the quick heat load.

PATENTED JUN 15 1971 3,585,358

INVENTOR
OLE K. NILSSEN
BY Mueller, Aichele & Rauner
ATTYS.

AUTOMOTIVE QUICK HEAT SYSTEM

BACKGROUND OF THE INVENTION

Automotive vehicles with fluid cooled engines usually come equipped with conventional heater systems, each including a radiator to conduct heat from the coolant of the engine into the surrounding air and a fan for forcing the heated air into the passenger compartment to warm the occupants thereof and to defrost the windshield. As most drivers and passengers of automobiles are aware, however, when the weather is cold, and hence the engine, it takes a substantial length of time after the engine is started before the coolant is heated to a sufficient temperature to enable the conventional heating system to effectively produce heat. During this time the occupants of the vehicle must endure the cold, and ice may form on the windshield thereby impairing the driver's visibility and create an unsafe condition.

To solve these problems, secondary or auxiliary quick heat systems have been proposed for supplying heat during the interval of time beginning immediately after the engine is started and ending at some later time when the conventional heating system is operative. These prior art heating systems usually convert electrical energy into heat energy by supplying electrical power from the generator or alternator of the vehicle to resistive heating elements which are located near the fan of the conventional heating system so that the heated air in proximity to the elements can be forced into the passenger compartment. To produce enough heat to effectively and rapidly heat the passenger compartment while simultaneously defrosting the windshield, it is necessary for a substantial amount of current to be applied to the heating elements during the time that the auxiliary heating system is in use. One prior art system suggests that switching contacts such as those of a heavy duty relay can be placed between the alternator and the resistive heating elements for switching this current therebetween. Because these contacts must make and break large currents they are subjected to the deleterious effects of arcing and, consequently, they may have to be regularly replaced. Furthermore, the relay including the switching contacts and their control mechanism takes up space and decreases the reliability and longevity of the auxiliary heating system. Moreover, the conventional automotive alternator is not designed to supply enough electrical power to the heating elements for quickly heating the passenger compartment while effectively defrosting the windshield.

SUMMARY OF THE INVENTION

It is one object of this invention to provide an improved auxiliary heating system for instantly supplying heat to the passenger compartment of an automotive vehicle.

It is another object of this invention to provide an electrical power generating system suitable for use in an automotive vehicle which will generate a substantial amount of electrical power which can be delivered to and removed from either of two loads without using switching contacts directly between the loads and the source of the electrical power.

In one embodiment of the invention, comprising an auxiliary heat generating system, resistive heating loads are placed near the fan of a conventional heating system of an automatic vehicle and when quick or instant heat is desired a unique automotive alternator system delivers electrical power to the heating elements. The alternator system includes, for instance, two rotating field alternators mechanically arranged so that their outputs are in phase synchronism with each other. A switching mechanism is operable to a first position to connect a battery or control voltage of the same polarity across the field windings to consequently cause the output voltages of the alternators to be in phase. The switching mechanism is operable to a second position to interconnect the battery or control voltage and field windings such that the voltages across the field windings are of opposite polarity, thereby causing the alternating voltage outputs of the alternators to be 180° out-of-phase with each other. The output of one alternator is connected between a reference potential and one end of the resistive heating load and the output of the other alternator is connected between the reference potential and the other end of the resistive heating load. Moreover the resistive heating load has a center tapped portion which is connected through the automotive load to the reference potential. Consequently, when the outputs of the alternators are in phase with each other there is little electrical power delivered to the heater load, but there is a substantial amount of power supplied through the center tap to the automotive system. Conversely, when the outputs of the alternators are equal in magnitude and 180° out-of-phase with each other there is virtually no voltage developed at the center tap and an alternating voltage is developed across the resistive heating elements which generate heat to be supplied to the passenger compartment of the automotive vehicle.

DESCRIPTION OF THE PREFERRED EMBODIMENT

A preferred embodiment of the invention is in the form of a source of quick or instant heat which supplements the conventional radiator-fan heating systems of automotive vehicles having fluid cooled engines. The quick heat system is primarily used during the time between when the engine is started and when the conventional heating system becomes effective.

Figure 1:
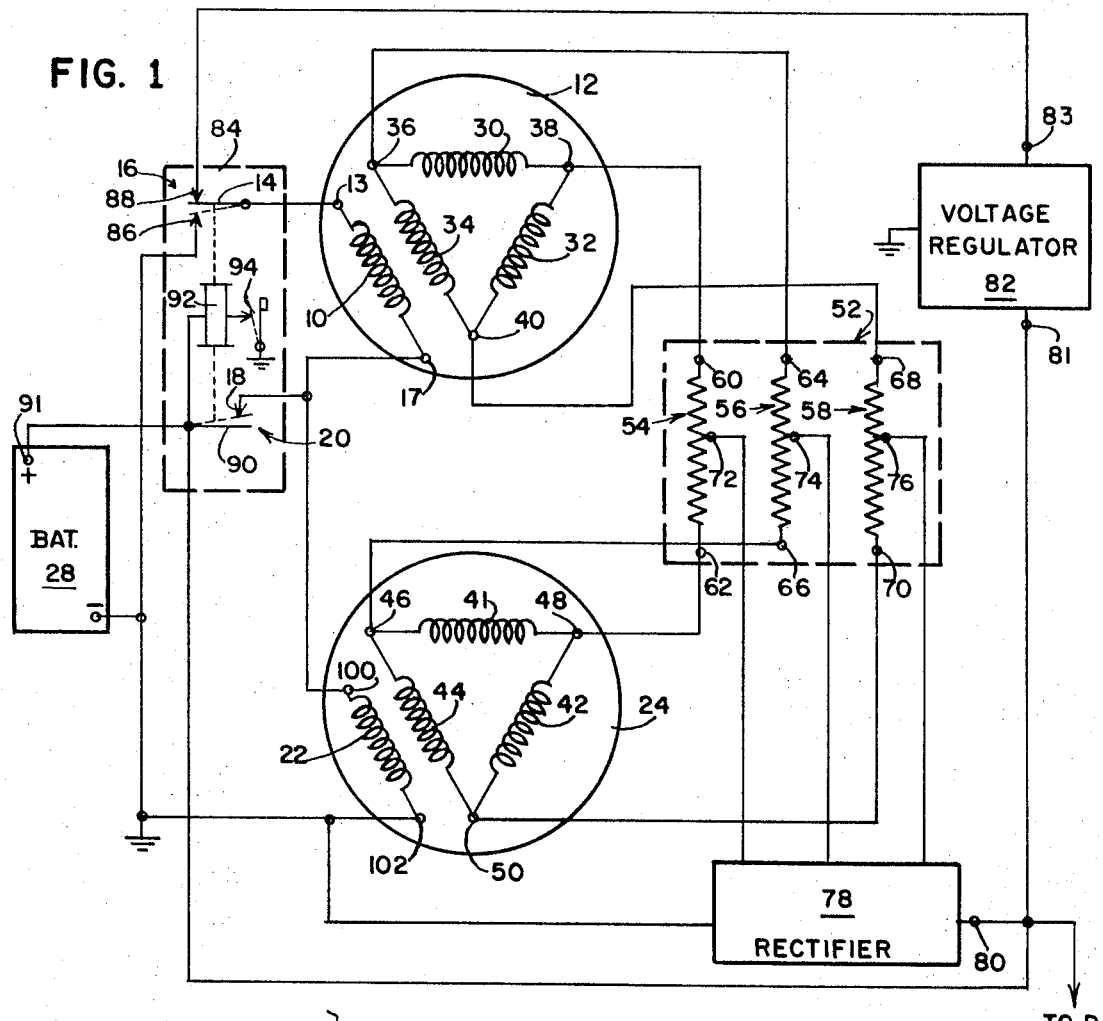
FIG. 1 is a schematic diagram of the auxiliary heating system of one embodiment of the invention.

Referring to FIG. 1, field winding 10 is included on the rotor of alternating current generator or alternator 12. One end 13 of winding 10 is connected by a slipring and brush assembly to movable contact or selecting portion 14 of switch 16, and the other end 17 is connected both to contact 18 of switch 20 and to one end of field winding 22 of alternator 24, the other end of which is connected to a ground or a reference potential. Rechargeable storage battery 28 provides current for fields 10 and 22. Alternator 12 contains delta connected stator windings 30, 32 and 34 which are joined at nodes 36, 38 and 40. These stator windings cooperate with the magnetic flux from rotating field winding 10 in the known manner to develop three-phase alternating potentials at nodes or outputs 36, 38 and 40.

Similarly, field winding 22 is included on the rotor of alternator 24 which is rotated, for example, by the same shaft which rotates the rotor of alternator 12 so that field windings 10 and 22 are rotated in synchronism with each other. Alternator 24 includes delta connected stator windings 41, 42 and 44 which are joined at nodes 46, 48 and 50. These stator windings cooperate with the magnetic flux from field winding 22 to develop three-phase alternating voltages at nodes 46, 48 and 50 which are respectively phase locked or in phase synchronism with the voltages occurring at nodes 36, 38 and 40 of alternator 12, because of the mechanical coupling between field windings 10 and 22. The alternators are designed such that their output voltages have the same amplitudes.

Heater load 52 is comprised of three center tapped resistive heating elements 54, 56 and 58 which are physically located near the fan of the conventional heating system so that air heated by them can be forced into the passenger compartment of the automotive vehicle. Terminal 60 at one end portion of heating element 54 is connected to output node 38 of alternator 12, and terminal 62 at the other end portion is connected to the corresponding output node 48 of alternator 24. Likewise, terminal 64 of heating element 56 is connected to output node 36 of the alternator 12 and terminal 66 is connected to the corresponding output node 46 on alternator 24. Terminal 68 of heater element 58 is connected to output node 40 and terminal 70 is connected to output node 50. Respective center taps 72, 74 and 76 of the heating elements 54, 56 and 58 are connected to three-phase rectifier 78 which can be any one of the known types and which provides a DC output voltage between terminal 80 and the reference or ground potential.

Terminal 81 of voltage regulator 82 is connected to the output terminal 80 of rectifier 78 and terminal 83 is connected to terminal 88 of switch 16. The regulator can, therefore, sense the DC output voltage and regulate the field currents of field windings 10 and 22 in the known manner to limit the output voltages of the alternators so that excessive voltage is not supplied either across battery 28, which is connected between ground and terminal 80, or across the automotive DC load which is connected in parallel with battery 28 and which includes the ignition system, radio, air conditioning, and other electrical equipment of the automotive vehicle.

Switch mechanism 84 includes switch 16 and switch 20. Switch 16 has movable contact 14 for making connection either to fixed contact 86 which is connected to ground or to fixed contact 88, which is connected to terminal 83 of voltage regulator 82. Switch 20 contains the fixed contact 18 and movable switching contact or portion 90 which is connected to positive terminal 91 of battery 28. Switch system 84 also includes solenoid 92 which is connected in series with a temperature sensitive bimetal switch 94 and battery 28. The solenoid 92 when energized by the closure of switch 94 simultaneously activates movable contacts 14 and 90 to move the same from their normal positions in which they are drawn in the figure to their dotted positions.

In operation, therefore, unless normally open bimetal switch 94 is closed movable contacts 14 and 90 are in the positions shown in the figure thereby connecting field winding 10, field winding 22, voltage regulator 82, and battery 28 in a series circuit. Voltage regulator 82 regulates the current flowing through the field windings to maintain alternating voltages having regulated amplitudes at nodes 36, 38 and 40 of alternator 12 and at nodes 46, 48 and 50 of alternator 24. Furthermore, since the voltages across field windings 10 and 22 have the same relative polarities to each other and the fields are phase locked, the voltages at nodes 36, 38 and 40 will be respectively in phase with the voltages at nodes 46, 48 and 50. Since the voltages across the heater elements 54, 56 and 58 are regulated and since the elements are comprised of material having little resistance, there is little voltage developed across the heating elements and, therefore, not much power is dissipated in them and little heat is radiated from them. The current through the portions of the heater elements is a function of the resistance of automotive DC load connected to terminal 80 and the charge current delivered to battery 28.

Figure 2:
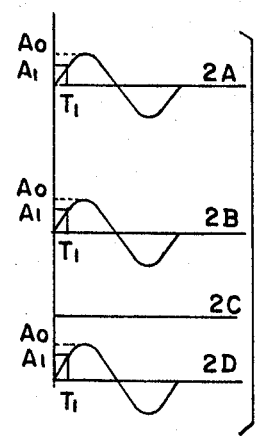
FIG. 2 illustrates the waveforms of the voltages at the end points and at the center tap of a heating element when the auxiliary heating system is operated in its regulated, in phase mode.

For instance, the voltage at terminal 60 of element 54 is of the form shown in FIG. 2A and the voltage at terminal 62 is of the form shown in FIG. 2B. Since at time $T_1$, for example, both of these voltages have the same absolute magnitude $A_1$ and the same polarity, there is virtually no voltage, as shown by FIG. 2C, dropped across the heating element if the DC automotive load and battery are drawing no current. The voltage at center tap 72, with respect to ground, however, has a magnitude effectively equal to either of the magnitudes at terminals 60 or 62 as illustrated by FIG. 2D. Therefore, a three-phase alternating voltage having an amplitude effectively equal to output voltage of either alternator 12 or 24 is developed between center taps 72, 74 and 76, and the reference potential and, consequently, rectifier 78 is supplied with a regulated three-phase AC voltage which is rectified and appears at terminal 80 as a regulated DC voltage to be supplied to voltage regulator 82, battery 28, and the load presented by the circuitry of the automotive vehicle.

On the other hand, when the contacts of bimetal switch 94 are closed, current is supplied from battery 28 through solenoid 92 of switching mechanism 84 thereby transferring movable contact 14 to fixed contact 86 and movable contact 90 to fixed contact 18. Now terminal 13 of field winding 10 is connected to ground through switch 16 rather than through regulator 82 to positive terminal 91 of battery 28. Terminal 17 of field winding 10 is now connected to the positive terminal 91 of the battery. The polarity of the voltage across field winding 10 is, therefore, reversed with respect to what it was before switching mechanism 84 was activated. Terminals 100 and 102 of field winding 22 remain connected to the positive potential of battery terminal 91 and ground, respectively. Therefore, the polarity of the voltage across field winding 22 is the same as it was before switch 84 was activated. Inasmuch as the field windings are, therefore, now connected in parallel with each other across the battery they have twice as much voltage across each one of them as they did in the previous series connection. In addition, voltage regulator 82 has been disconnected from the field current path, and therefore the output voltages of the first and second portions are no longer regulated.

Since the field currents are flowing in opposite directions and the field windings are phase locked the voltages at outputs 36, 38 and 40 of alternator 12 will be respectively 180° out-of-phase with the outputs 46, 48 and 50 of alternator 24 thus impressing a potential across the resistive heater elements 54, 56 and 58 which has an instantaneous amplitude equal to the instantaneous sums of the amplitudes of the voltages impressed thereacross. The center taps 72, 74 and 76 of the elements, on the other hand, remain at the reference potential thereby providing no voltage to rectifier 78 or at output 80. Incidentally, if points 72, 74 or 76 are not center taps then there will be a voltage developed across rectifier 80.

Figure 3:
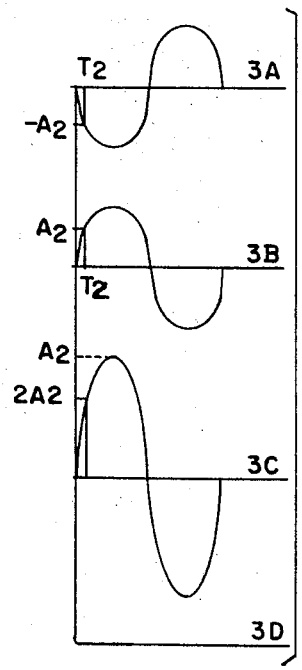
FIG. 3 illustrates the waveforms of the voltages at the end points and at the center tap of a heating element when the auxiliary heating system is operated in its unregulated, out-of-phase mode.

For instance, the voltage at terminal 60 of element 54 is now of the form shown in FIG. 3A and the voltage at terminal 62 is of the form shown in FIG. 3B. Since at time $T_2$, for example, these two voltages have the same absolute magnitude $A_2$ but opposite polarities, there is a voltage of magnitude $2A_2$ as shown by FIG. 3C developed across the heating element. There is, however, no voltage developed at center tap 72 with respect to ground as shown by FIG. 3D. Furthermore, since the alternators are now operating in their unregulated modes, their instantaneous voltage amplitudes will be increased, with respect to the regulated mode, while being a function of the angular velocities of their field windings. At an engine speed of approximately 2,500 r.p.m. each alternator will produce about five times as much voltage amplitude in the unregulated mode as in the regulated mode thereby impressing unregulated voltages having amplitudes of about 10 times that of the regulated voltage amplitude across the resistive heater elements to produce a substantial amount of heat.

Moreover, the heating elements may be constructed from material having a positive resistive temperature coefficient so that they have less resistance and, therefore, dissipate less power when the system is operated in its regulated mode with current being delivered to the automotive DC load than when the system is operated in its unregulated, heat-producing mode.

The invention contemplates that the phases or amplitudes of the alternating voltage outputs of one alternator with respect to the phases or amplitudes of the alternating voltage outputs of the other alternator can be varied either mechanically or electrically thereby causing a distribution of power between heater load 52 and the automotive DC load. For instance, if the phase angle of the voltage at terminal 60 is 90° out-of-phase with the voltage at terminal 62 there will be a voltage generated across heater element 54 and across the automotive DC load. Also, if the magnitude of the output voltage at terminal 60 is greater than the magnitude of the output voltage at terminal 62, even though they are in phase, then terminal 72 will not be at the reference potential and a voltage will be delivered across the automotive DC load. Many other variations of the system of this invention may be envisioned by one skilled in the art to provide distribution of power between the heater load and the automotive DC load.

Bimetal switch 94 can be located near heater load 52 in the air ducts of the conventional heater of the automotive vehicle. On a cold day when the vehicle is first started the contacts of switch 94 will close thereby causing quick heat to be radiated from the heater load 52 into the duct to raise the temperature of the air therein. After a few minutes when the air in the duct has been heated to a temperature on the order of 120°, the contacts of bimetal switch 94 will open thereby returning the alternators to their regulated, in phase mode of operation to produce a voltage at the output of rectifier 84 for recharging storage battery 28. If the passenger compartment is not yet warmed or the conventional heating system is not yet operating, the temperature of the air in the duct will subsequently drop to a lower temperature, say 90°, causing the contacts of switch 94 to close and the heating system will again operate in its unregulated out-of-phase mode thereby generating more heat in the duct. This thermally activated cycling between the two modes allows the power generating system to efficiently serve the purposes of providing quick heat and charging the battery. Moreover, it is contemplated by the invention that additional, manually operated switches could be inserted either in series or in parallel with bimetal switch 94 so that an operator can control the operation of the system.

What has been described, therefore, is a power generating system for selectively supplying power to either of two loads, i.e., resistive heating elements and the direct current load of the automotive vehicle. Besides being able to supply enough heat energy for simultaneously defrosting the windshield and warming the passenger compartment of an automotive vehicle, the invention eliminates the undesirable prior art switching contacts which connect and disconnect output power from the generating source to the heating elements.

I claim:

1. An electrical power generating system for selectively supplying power to one of first and second load means, including in combination, first generator means developing a first alternating voltage at its output, second generator means developing a second alternating voltage at its output, the first load means having first, second and third terminals, said first and second terminals being connected to said outputs of said first and second generator means respectively, the second load means connected between said third terminal and a reference potential, control means coupled to said first and second generator means for determining the phases of said first and second alternating voltages, said control means being operable to a first condition causing said first and second generator means to operate in phase to substantially energize only said second load means, said control means being operable to a second condition causing said first and second generator means to operate out-of-phase to substantially energize only said first load means.

2. The electrical power generating system of claim 1 further including a voltage supply and wherein said first and second generator means are rotating field alternators respectively having field windings, said control means includes a switch means for selectively connecting said voltage supply to said field windings, said switch means being operable to said first condition to connect field voltages of the same polarity to each of said field windings thereby causing said first and second generator means to generate in phase alternating output voltages, said switch means being operable to said second condition to connect field voltages of opposite polarities to said field windings thereby causing said first and second generator means to generate out-of-phase alternating output voltages.

3. The electrical power generating system of claim 2 further including, regulator means connected by said switch means and to said first and second generator means for controlling the amplitude of said first and second alternating voltages, said switch means being connected to said regulator means such that with said switch means operated to its second condition said regulator means is disconnected from said first and second generator means thus allowing said first and second generator means to deliver an increased amount of power to said first load means.

4. The electrical power generating system of claim 1 wherein said first load means is a resistive voltage divider means comprising a resistive material which is suitable for changing electrical power into heat to be supplied to the passenger compartment of an automotive vehicle.

5. The electrical power generating system of claim 1 wherein said first and second generator means are alternators having rotating field windings which are mechanically intercoupled so that they rotate in synchronism with each other to cause said first and second alternating voltages to be phase locked.

6. An auxiliary heat generating system for supplying heat to the passenger compartment of an automotive vehicle, including in combination, first generator means having control and output terminals and developing a first alternating current voltage between said output terminals with a phase which depends on the polarity of a control voltage delivered to said control terminal, second generator means mechanically coupled to said first generator means and driven in synchronism therewith, said second generator means having control and output terminals and developing a second alternating voltage between said output terminals thereof with a phase which depends on the polarity of a control voltage delivered to said control terminal thereof, resistive heating means having one end connected to one of said output terminals of said first generator means and the other end connected to one of said output terminals of said second generator means and a center tap, load means connected between said center tap and a reference potential, a control voltage supply, switching means connected to said control terminals of said first and second generator means and to said control voltage supply, said switching means being operable to a first condition whereby control voltages of the same polarity are connected from said control voltage supply to said control terminals of said first and second generator means so that said first and second alternating voltages are in phase with each other to substantially deliver power only to said load means, said switching means being operable to a second condition whereby control voltages having opposite polarities are connected from said control voltage supply to said control terminals of said first and second generator means so that said first and second alternating voltages are out-of-phase with each other to substantially deliver power only to said resistive heating means which generates heat to be supplied to the passenger compartment of the automotive vehicle.

7. The auxiliary heat generating system of claim 6 further including, regulator means normally connected by said switching means to said first and second generator means for controlling the amplitude of said first and second alternating voltages, said switching means being connected to said regulator means such that in response to being operated to said second condition said regulator means is disconnected thereby from said first and second generator means thus allowing said first and second generator means to operate in unregulated modes to deliver an increased amount of power to said resistive heating means.

8. The auxiliary heat generating system of claim 6 wherein said first and second generator means each include a rotating field alternator having a field winding, and said alternating current voltages are proportional to the voltages across said field windings, said field windings and said control voltage supply being connected in series by said switching means being operated to said first condition thereby causing alternating current voltages of a given magnitude, said field windings and said source of control voltage being connected in parallel by said switch means being operated to its second condition thereby providing said alternating current voltages of substantially greater magnitudes than said given magnitude.

9. The auxiliary heat generating system of claim 6 wherein said resistive heating means is comprised of material having a temperature coefficient.